Oct. 12, 1948.     H. ST. PIERRE     2,451,253
METHOD OF MAKING CHAIN LINKS
Filed Oct. 14, 1943
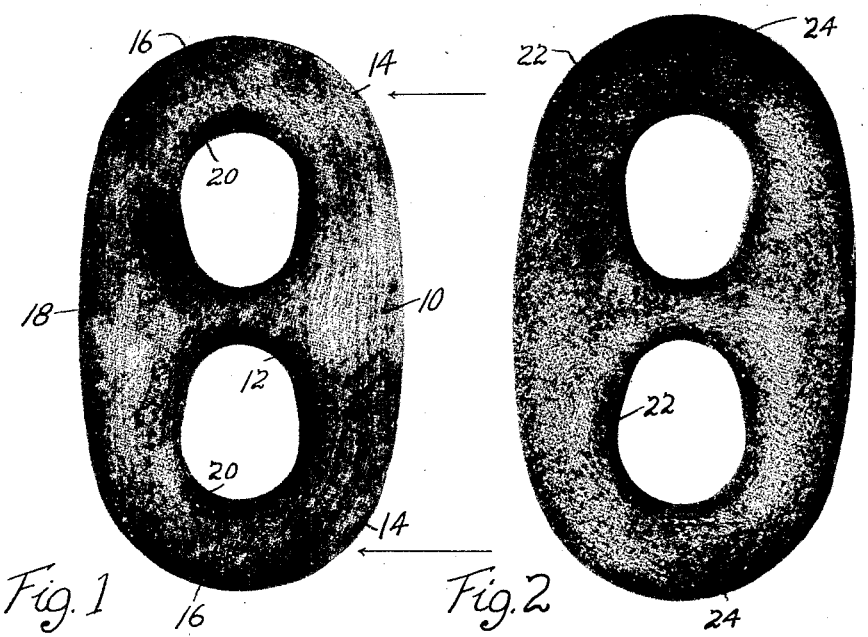
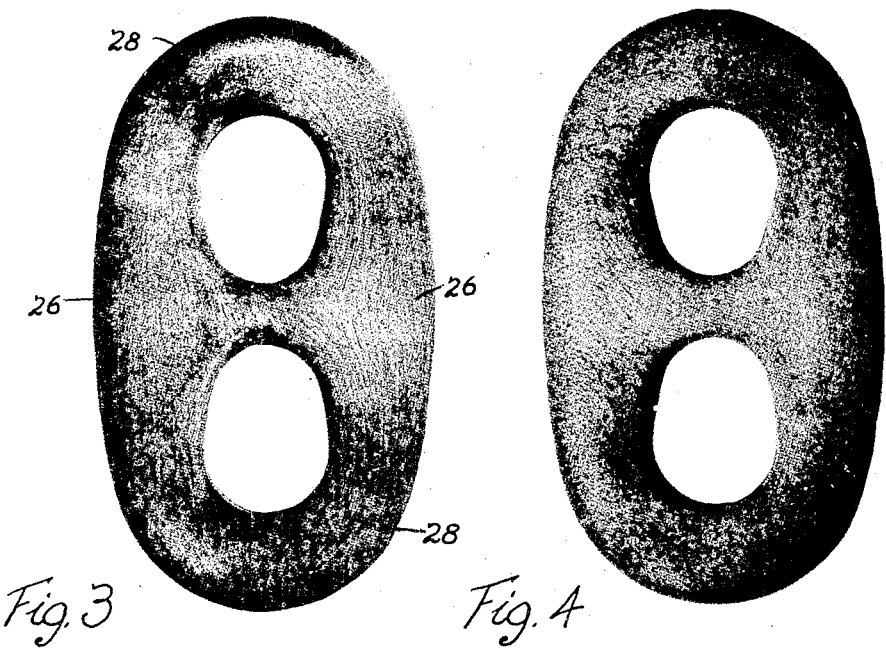
INVENTOR
HENRY ST. PIERRE
By Attorney
Charles R. Fay Patented Oct. 12, 1948

2,451,253

UNITED STATES PATENT OFFICE 2,451,253

METHOD OF MAKING CHAIN LINKS

Henry St. Pierre, Worcester, Mass.

Application October 14, 1943, Serial No. 506,232

2 Claims. (Cl. 59—12)

This invention relates to the chain links which are completely and solidly forged from solid blocks or bars of metal by means of dies.

Objects of the invention include the provision of solid forged chain links having specific flow line structures which enhance the strength of the links and which are formed in a definite pattern by the forging operations.

More specifically the objects of the invention include the provision of improved flow line grain structure particularly in the ends of chain links where the links bear the greatest strain, it being well known in the art that each of the longer sides of the links bears only one-half of the strain exerted on the link.

Other objects and advantages of the invention will appear hereinafter, reference being had to the accompanying drawings, in which Fig. 1 shows a forged link having a specific flow line structure which is referred to as a "side grain";

Fig. 2 is a view similar to Fig. 1 but showing a link having a "cross grain";

Fig. 3 is a view similar to Fig. 1 but showing a link having a "straight grain"; and Fig. 4 shows a link having what is referred to as an "upset grain."

The present invention relates to chain links which are forged from solid blocks of metal in a series of operations which form the links in completed final condition by means of dies made to the link shape. In the accompanying drawing there are shown four different types of flow line grain structures, each of these four types providing links which are improved in strength at their ends due to the different flow line structure as will be hereinafter described.

Each of the links as shown is a stud link, but it will be apparent that it is not necessary to the present invention that the links should be of this type, and it is to be understood that I am not limited in this respect except as set forth in the claims. The links are all of the same general ellipsoidal form having a major axis centrally and longitudinally of the link and a minor axis at right angles thereto and passing through the center of the stud in cases where the link is provided with a stud.

Referring to Fig. 1 the flow line structure is apparent as being generally parallel to the major axis of the link in the longer sides of the link as is indicated in the region of reference numeral 10. This structure is somewhat distorted to flow partially into the stud as at 12. The flow line structure is curved at approximately an area that may be referred to as a junction at 14 between the longer side of the link and the shorter end portions which form the ends of the link. In the area at 14 the flow lines are seen to curve around in general conformity with the shape of the link at this point and then proceed in a direction generally transverse of the shorter end portion to emerge, in a manner of speaking, from the shorter end portion at 16. At the portions 18 of this link the flow line structure also curves to conform to the link shape but there is substantially a reverse curve at 20 which flows into parallelism with the flow line at 16, and this grain construction results in the general flow line lying at an angle to the major axis of the link; the direction of the flow lines at 20, 20 being non-parallel in such a way that they emerge from the link to one side of the major axis, and in the case shown the flow lines emerge at both ends of the link at the same side of the said major axis; i. e., to the left in Fig. 1.

The manner in which the link of Fig. 1 is made is by taking a rod or block of solid steel having its flow line parallel, and forging the block at its ends in the same direction transversely of the flow line so as to form the flow lines in the block on a curve at the ends of the block. This results in a crescent shaped flow line at the side of the block which eventually becomes the side of the link where the character 14 appears, and the flow line at the other side conforms in general to the flow line shown at 18. The block is then placed in the hammer and forged in the die in such a way that the link shown in Fig. 1 results, it being noted that the direction of movement of the forging die is at a right angle to the direction of the initial forging step, the latter direction being shown by the arrow.

The link shown in Fig. 2 is made by forging the link in the die transversely across the flow line structure appearing in the blank. In this case the block from which the link is being made may be flattened out initially to make it wide enough to forge the link crossways of the blank. The grain structure extends generally parallel to the minor axis of the link, but this is affected by the die as will be seen at 22, so that the flow lines are not parallel throughout the link, the original flattening step also modifying the grain. The main consideration in this form of the invention is that the flow lines are generally parallel to the shorter end portions as at 24, this construction resulting in especially great resistance to breakage in the end portion as the breakage normally occurs at this point.

In Fig. 3 there is shown a link which is referred to as the "straight grain" link, the flow lines at 26 being generally similar to those at 10 in Fig. 1, but here the initial forging or distortion of the flow line as represented at 16 in Fig. 1 is lacking, and the flow line curve at 28 is similar to the curvature at 14, but the lines emerge parallel to the major axis as at 30.

The link shown in Fig. 4 is formed by upsetting a solid bar and pounding in a direction parallel to the original flow line structure of the bar. When the bar is sufficiently flattened the flow line therein will be so distorted as to be substantially heterogeneous, and in this case the link does not have any regular flow line pattern. After the upsetting the link is forged as before, the dies acting on the blanks in the same direction as the upsetting force.

The most important consideration in a chain link resides in the strength of the link under tension and it has been found that almost invariably the links will break substantially along the major axis thereof in the shorter end portions. Therefore any means which can be found to strengthen the end portion without adding weight to the link is bound to result in a stronger link and a stronger chain per unit of weight. All four of the flow line formations herein disclosed add to the strength of the links particularly at the ends and therefore greatly improve their characteristics. In Fig. 1 it will be obvious that the flow lines at 20 and including areas at 16 and 18 are closest together or compressed relatively to the flow line as at 10. This provides a denser and stronger material in the end portion relative to the portions at 10 and thus the object has been achieved. It will be clear that the end portions of the link must carry a force equal to twice the tension carried by the side portions at 10, so that the link will break at the end portions unless strengthened at these points.

The same object is achieved by the link of Fig. 2 because the flow line formation in the end portion is at right angles to the ordinary tension, and since metal will tend to split along its flow lines, greater strength in the end portion is achieved by having the flow line transverse of the tensioning force.

The Fig. 3 construction is similar to the Fig. 1 construction except that the merging of the flow line is along the major axis instead of inclined relative thereto, but in Fig. 3 the flow lines 30 will be seen to be closer together than at 26, and thus the link is stronger at its end per unit area than in the long side portion, this being a desirable condition as above explained due to the tensioning at the end of the link.

In the Fig. 4 construction the heterogeneous flow line formation eliminates the tendency to split along flow lines, and thus this link is also stronger than links as heretofore made. In all four cases the formation of the eye during the forging operation affects and distorts the flow line structure as is easily seen in the disclosure. In all cases, however, it is found that the end portions are stronger due to this effect and it is therefore seen that the beneficial results obtained in the invention are peculiar to chain links and could not be obtained in ordinary forging, at least to the degree resulting in this case.

I claim:

1. The method of forging a chain link from a block of metal having a substantially straight flow line formation, including the step of upsetting the block in a direction parallel to said flow line formation and thereafter forging the link from the upset block.

2. The method of claim 1 wherein the link-forging step is made in the same direction as the upsetting force.

HENRY ST. PIERRE.

REFERENCES CITED

The following references are of record in the file of this patent:

UNITED STATES PATENTS

| Number | Name | Date |
| --- | --- | --- |
| 658,722 | Masion | Sept. 25, 1900 |
| 1,670,758 | Witherow | May 22, 1928 |
| 1,838,025 | Waldron | Dec. 22, 1931 |
| 1,908,072 | Spang | May 9, 1933 |
| 2,284,824 | Hungerford | June 2, 1942 |

FOREIGN PATENTS

| Number | Country | Date |
| --- | --- | --- |
| 495 | Great Britain | Feb. 20, 1857 |
| 17,973 | Great Britain | Sept. 5, 1905 |
| 23,568 | Great Britain | Oct. 17, 1913 |